United States Patent [19]

Ikebe et al.

[11] Patent Number: 5,218,483
[45] Date of Patent: Jun. 8, 1993

[54] OBJECTIVE LENS MOVING APPARATUS

[75] Inventors: Kouichi Ikebe; Hiroshi Ozaki, both of Amagasaki, Japan

[73] Assignee: Mitsubishi Denki Kabushiki Kaisha, Japan

[21] Appl. No.: 478,478

[22] Filed: Feb. 12, 1990

[30] Foreign Application Priority Data

Feb. 15, 1989 [JP] Japan .................................. 1-35404

[51] Int. Cl.$^5$ ........................... G02B 7/02; G11B 7/00
[52] U.S. Cl. .................................... 359/813; 359/824; 369/44.15
[58] Field of Search ............... 350/242, 245, 248, 252, 350/255, 257, 247, 320; 369/44.11–44.19, 44.21–44.22; 359/811–830

[56] References Cited

U.S. PATENT DOCUMENTS

| | | | |
|---|---|---|---|
| 3,897,998 | 8/1975 | Someya et al. | 350/255 |
| 4,473,274 | 9/1984 | Yano et al. | 359/824 |
| 4,482,988 | 11/1984 | Tsurushima et al. | 369/44.14 |
| 4,566,089 | 1/1986 | Kime | 350/255 |
| 4,571,026 | 2/1986 | Maruta | 359/824 |
| 4,678,276 | 7/1987 | Sekimoto et al. | 359/824 |
| 4,679,903 | 7/1987 | Kasahara et al. | 350/255 |
| 4,687,296 | 8/1987 | Terayama et al. | 359/824 |
| 4,796,248 | 1/1989 | Ozaki et al. | 350/255 |
| 4,838,649 | 6/1989 | Ichikawa et al. | 350/247 |

FOREIGN PATENT DOCUMENTS

| | | | |
|---|---|---|---|
| 164513 | 9/1984 | Japan | 350/255 |
| 61-3334 | 1/1986 | Japan | 350/255 |
| 1307424 | 4/1987 | U.S.S.R. | 350/247 |

OTHER PUBLICATIONS

Japanese patent application Laid-Open No. 62-158632 Date: Oct. 8, 1987.
Japanese patent application Laid-Open No. 62-243136 Date: Oct. 23, 1987.
"High-Speed Servo Technology for Optical Disk Drive." by Katoh et al. SPIE vol. 899 Optical Storage Technology and Applications (1988): pp. 24–30.

Primary Examiner—Bruce Y. Arnold
Assistant Examiner—Thong Nguyen
Attorney, Agent, or Firm—Wolf, Greenfield & Sacks

[57] ABSTRACT

An objective lens moving apparatus, wherein a pole, which is set upright on a base and supports an objective lens, is fitted with some eccentricity into a hole of a lens holder which holds the objective lens and can be freely turned and slid. The lens holder is elastically supported on the base by an elastic member. In this objective lens moving apparatus, the pole is fitted into the hole of the lens holder opposingly to an elastic force of the elastic member, and the inner face of the hole of the lens holder is always pressed against the pole. Accordingly, the axis of the hole, namely, the optical axis of the objective lens the axis of the pole are always kept almost parallel to each other.

12 Claims, 4 Drawing Sheets

OBJECTIVE LENS MOVING APPARATUS

BACKGROUND OF THE INVENTION

1. Field of the Invention

The present invention relates to an objective lens moving apparatus such as used in an optical disk apparatus to record and/or reproduce information.

2. Description of Related Art

FIGS. 1 through 3 show a conventional objective lens moving apparatus in an optical disk apparatus disclosed in Japanese Utility Model Application Laid-Open No. 62-158632. FIG. 1 is its plan view, FIG. 2 is a cross-sectional view at a cross-sectional line II—II in FIG. 1, and FIG. 3 is a magnified view of the principal part of FIG. 2. In these figures numeral 1 indicates a base of the objective lens moving apparatus. A circular cylinder-shaped pole 2 is attached to the base 1 almost perpendicularly to it. Numeral 3 indicates a lens holder holding an objective lens 5 which focuses light spot on an optical disk (not shown in the figure). The lens holder 3 has protrusions 3a and 3a at both its ends and a circular sliding hole 3b passing through its central part to form a bearing part. The optical axis 5a of the objective lens 5 is set to be parallel with the axis of the sliding hole 3b. The pole 2 is loosely fitted into the sliding hole 3b and the lens holder 3 can be freely turned around the pole 2 and freely slid in the axial direction, and it is supported on the base 1 by an elastic member 4 made of silicone rubber in the shape of a rectangular frame. On the lens holder 3 a focus control coil 6 is fixed which moves the objective lens 5 in the direction of the axis 2a of the pole 2 to control the focus of the light spot by moving the lens holder 3. And on the focus control coil 6, a tracking control coil 7 is set which turns the objective lens 5 around the pole 2 to move it in the radial direction of a track so as to control tracking. Permanent magnets 8a for moving which are set on the base 1, upper yokes 8b, and inner yokes 8c which are set on the base 1 inside of the focus control coil 6 make a magnetic circuit intersecting the focus control coil 6 and the tracking control coil 7. The middle parts 4a and 4a of the long sides of the elastic member 4 are shaped slightly flat, and the elastic member 4 is fixed on the upper yoke 8b by means of set screws 9 and 9. Fitting holes 4b and 4b are provided in the middle parts of the short sides of the elastic member 4, and the lens holder 3, whose protrusions 3a and 3a are fitted into these holes 4b and 4b, is supported by the elastic member 4. The set screws 9 and 9 are disposed respectively at locations vertically symmetric with respect to the pole 2, namely, respectively at locations dimension A vertically distant from the horizontal center line (2HL) as shown in the figure.

Next, operation of this mechanism is described below. When deviation of focusing of the light spot has been detected by a detection sensor (not shown in the figure), an electric current corresponding to an amount of this deviation flows into the focus control coil 6 and focusing control of the light spot is performed by moving the lens holder 3, namely, the objective lens 5 in the direction of the axis 2a of the pole 2 under the influence of the magnetic field made by the permanent magnets 8a. At this time the elastic member 4 of silicone rubber controls elastically any excessive movement of the lens holder 3. And, in the case where a deviation of the light spot from a track has been detected, an electric current corresponding to an amount of this deviation flows into the tracking control coil 7 and tracking control is performed in the radial direction of the track by turning the lens holder 3 around the pole 2 under the influence of the magnetic field made by the permanent magnets 8a. In this case also, any excessive movement of the lens holder 3 is controlled elastically by the elastic member 4.

Since a conventional objective lens moving apparatus is composed in the above-mentioned way, it may be sometimes assembled in a state that the optical axis 5a of the objective lens 5 is slanted against the axis 2a of the pole 2 as shown in FIG. 3 when fixing the elastic member 4 by means of the set screws 9 and 9, due to existence of a little clearance between the sliding hole 3b of the lens holder 3 and pole 2, and as a result, this design suffers from the problem that aberration of the focused light spot is often increased.

SUMMARY OF THE INVENTION

An object of the present invention is to solve the focus aberration problem mentioned above.

An objective lens moving apparatus according to the invention is provided with a lens holder holding an objective lens as well as having a hole to fit a pole fixed on the base. The lens holder is held on the base by the elastic member with some eccentricity between the hole of the lens holder and the pole, such that the lens holder is freely rotatable around the pole and is freely slidable along the axis of the pole. The hole of the lens holder fits the pole opposingly to an elastic force of the elastic member.

Since the pole is fit into the hole of the lens holder opposingly to the elastic force of the elastic member, the inner face of the hole is always pressed against the pole and as a result, the optical axis of the objective lens (the axis of the hole of the lens holder) and the axis of the pole are kept almost parallel to each other both when the lens holder is turned around the pole and when it is slid in the axial direction of the pole.

An object of the invention is to provide an objective lens moving apparatus that is easy to assemble.

Another object of the invention is to provide an objective lens moving apparatus in which the optical axis of the objective lens is not slanted against the axis of the pole.

A further object of the invention is to provide a lens moving apparatus which prevents aberration caused by a slant of the optical axis of the objective lens.

The above and further objects and features of the invention will more fully be apparent from the following detailed description with accompanying drawings.

DESCRIPTION OF THE PREFERRED EMBODIMENTS

The present invention is described in detail based on the drawings that show a preferred embodiment.

Figure 1:
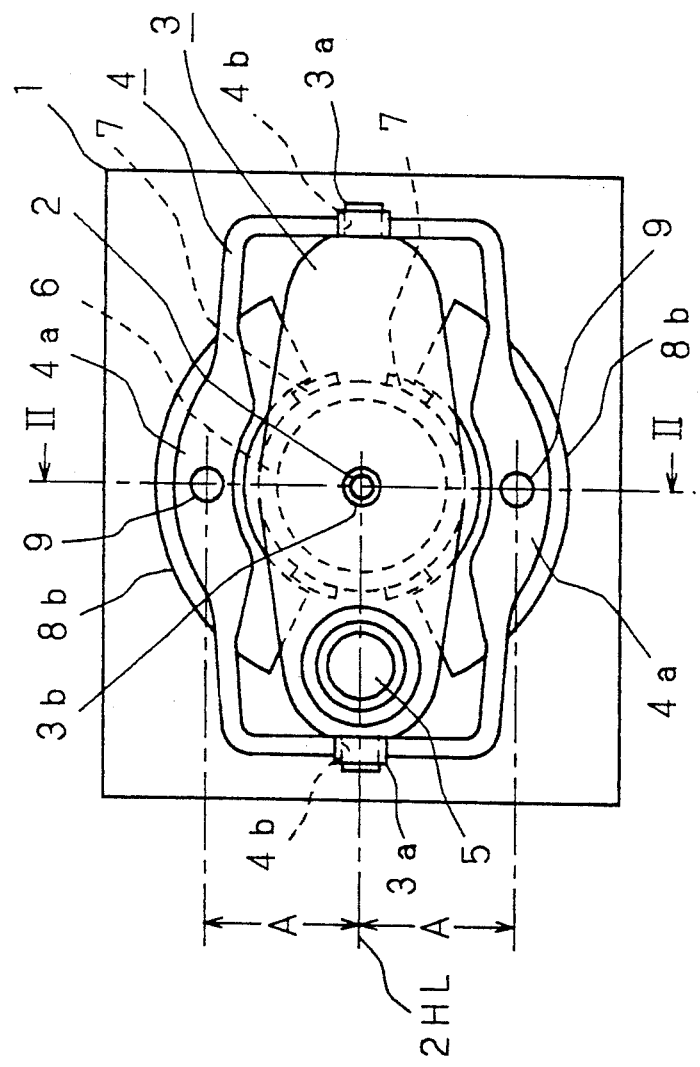
FIG. 1 is a plan view of a conventional objective lens moving apparatus.
Figures 2, 3:
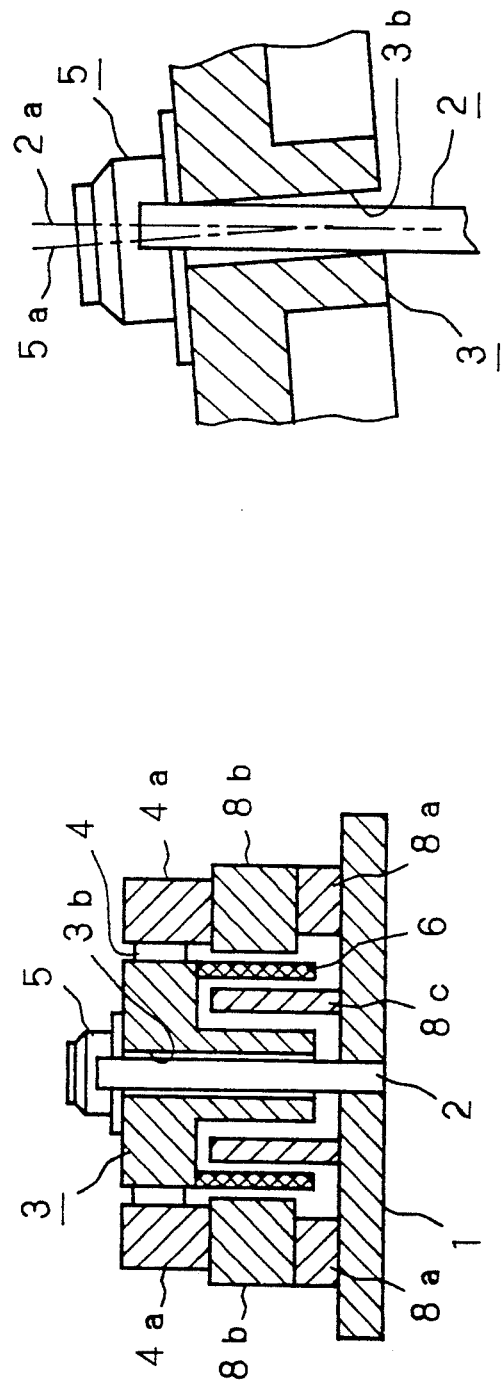
FIG. 2 is a cross-sectional view at a cross-sectional line II—II in FIG. 1.
FIG. 3 is a magnified view of the principal part of FIG. 2.
Figure 4:
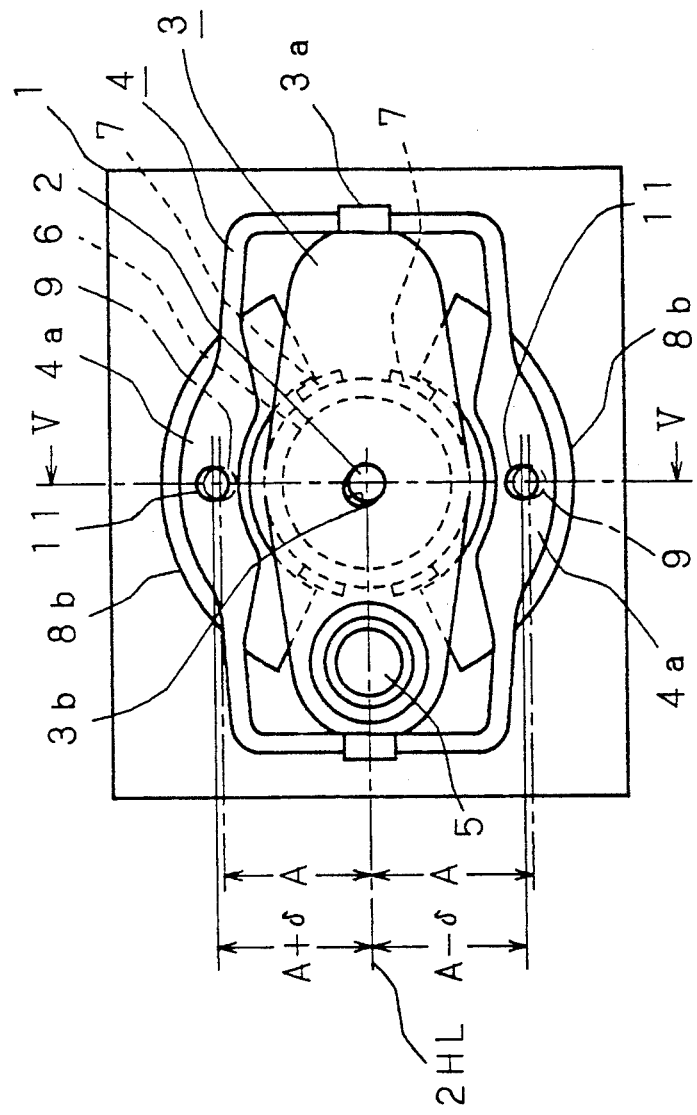
FIG. 4 is a plan view of an objective lens moving apparatus according to the present invention.
Figure 6:
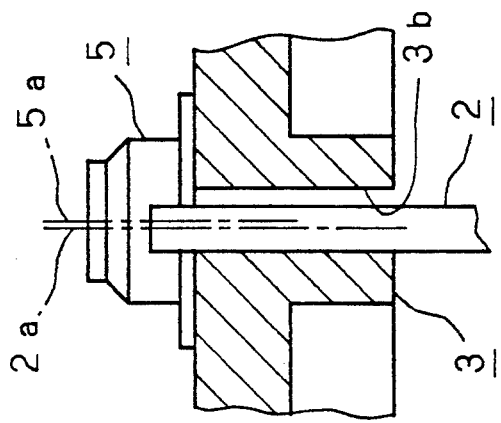
FIG. 6 is a magnified view of the principal part of FIG. 5.
Figure 5:
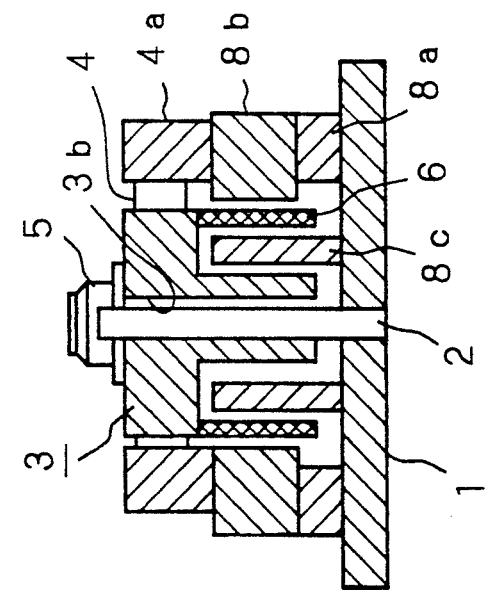
FIG. 5 is a cross-sectional view at a cross-sectional line V—V in FIG. 4.

FIGS. 4 through 6 show an embodiment of the invention for an optical disk apparatus, and in these figures portions having the same numerals as those in FIGS. 1 through 3 assigned to them indicate respectively the same members as those of the conventional apparatus. A pole 2 fixedly set on the base 1 is loosely fit into a sliding hole 3b of a bearing portion of a lens holder 3, and the lens holder 3 can be freely turned around the pole 2 and freely slid in the axial direction. The lens holder 3 is supported by an elastic member 4 by means of fitting protrusions 3a and 3a of the lens holder 3 into holes 4b and 4b provided in the middle parts of the short sides of the elastic member 4. The middle parts 4a and 4a of the long sides of the elastic member 4 are fixed on upper yokes 8b by means of set screws 11 and 11 which are the elastic member holder.

According to the invention, the set screws 11 and 11 are disposed at locations shifted parallel in the upper direction shown in the figure by $\delta$ from the positions A distant from and vertically symmetric with respect to the horizontal center line (2HL) of the pole 2, not at the positions vertically symmetric with respect to the pole 2. This distance $\delta$ is set at a value equal to or slightly greater than the clearance between the pole 2 and the sliding hole 3b of the lens holder 3 (difference between their radiuses). Numeral 9 and 9 led by an alternate long and short dash line indicate locations of the set screws 9 and 9 in the conventional apparatus for comparison.

In this objective lens moving apparatus composed in the above-mentioned way, the set screws 11 and 11 are disposed at locations asymmetric with respect to the horizontal center line of the pole 2 as described above. Therefore, when fixing the elastic member 4 on the base 1 by means of the set screws 11 and 11, the elastic member 4 made of silicone rubber is elastically transformed and presses the inner face of the sliding hole 3b in the direction perpendicular to the axis of the pole 2 to put the sliding hole 3b along the pole 2. Namely, the pole 2 is fit into the sliding hole 3b opposingly to an elastic force of the elastic member 4, and the lens holder 3 can be freely turned and freely slid in the axial direction. Accordingly, the axis of the sliding hole 3b is kept almost parallel with the axis 2a of the pole 2 (refer to FIG. 6). Since the axis of the sliding hole 3b is kept almost parallel with the axis 2a of the pole 2 even when the lens holder 3 is turned or slid in the axial direction in order to perform a focusing control and tracking control of the light spot, the optical axis of the objective lens 5 and the axis 2a of the pole 2 are kept almost parallel to each other.

Since the focusing control operation of the light spot by means of a focus control coil 6 and permanent magnet 8a, and the tracking control operation of the light spot by means of a tracking control coil 7 and permanent magnet 8a are the same as those in the conventional apparatus, explanation of them is omitted here.

In the above-mentioned embodiment, the elastic member 4 is made of silicone rubber, but may be also made of other material. Such metallic material as phosphor bronze or the like which is elastically transformed so that the lens holder 3 can be freely turned and slid may be also used for the elastic member 4.

And instead of setting the set screws 11 and 11 so as to put the axis 2a of the pole 2 and the axis of the sliding hole 3b eccentrically to each other, the pole 2 may be disposed eccentrically to the position of the set screws 9 and 9, and those two axes may be also disposed eccentrically to each other by another way such as making the elastic member 4 in a vertically asymmetric shape. A direction of eccentricity between both axes is not restricted to the vertical direction, but any direction of eccentricity will have a similar effect.

Additionally, the embodiment shown in FIG. 4 may adopt also a method of fixing the lens holder 3 on the base 1 (upper yokes 8b) by the elastic member 4, fitting the pole 2 into the lens holder 3, and then fixing the pole 2 at a predetermined position on the base 1 in which the pole 2 is eccentric to the sliding hole 3b of the lens holder 3.

Moreover, although the sliding hole 3b of the lens holder 3 in the embodiment is shown as a through hole, a non-through hole also will do.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An objective lens moving apparatus which adjusts a relative position of an objective lens to an object, comprising:

a base;

a pole having a cylindrical surface with a first radius and an axis parallel to a generator of the cylindrical surface and which is attached to said base and supports said objective lens;

a lens holder for holding said objective lens and having a circular hole with a second radius within which said pole is disposed, said lens holder being freely slidable along the axis of said pole and freely rotatable around said axis;

an elastic member which elastically holds said lens holder and having a center located at the center of the circular hole of the lens holder when the elastic member is in a relaxed state;

an elastic member holder for holding said elastic member fixed relative to said base;

said elastic member having first and second means for receiving the elastic member holder disposed at locations which are collinear with the center of the elastic member in the relaxed state;

said base having first and second reference positions disposed at locations which correspond to the receiving means of the elastic member in the relaxed state;

said base also having first and second means for receiving the elastic member holder disposed at locations shifted in a direction from said reference positions by a distance equal to or greater than the difference between the first radius and the second radius, thereby applying a force through said elastic member in a radial direction of said pole to said lens holder so as to press the inner face of the hole of the lens holder against said pole.

2. An objective lens moving apparatus according to claim 1 wherein said elastic member is ring-shaped so as to surround said lens holder.

3. An objective lens moving apparatus according to claim 1, wherein said elastic member holder is a screw.

4. An objective lens moving apparatus according to claim 1, wherein said elastic member is made of silicone rubber.

5. An objective lens moving apparatus according to claim 1, wherein said elastic member is made of metallic material which is elastically transformable.

6. The objective lens moving apparatus of claim 5 wherein the metallic material is phosphor bronze.

7. An objective lens moving apparatus according to claim 1, wherein said hole passes through said lens holder.

8. The objective lens apparatus of claim 1 wherein the object is an optical disk that a light spot is projected on.

9. An objective lens moving apparatus of an optical disk apparatus according to claim 8, further comprising:
a focus control means for sliding said lens holder in the axial direction of said pole according to a deviation of the focus of the light spot on the optical disk.

10. An objective lens moving apparatus of an optical disk apparatus according to claim 8, further comprising:
a tracking control means for turning said lens holder around the axis of said pole according to a deviation of the light spot from a track on the optical disk.

11. The objective lens moving apparatus of claim 1 wherein the elastic member has a shape which is symmetric about a line including the center of the lens holder hole and the center of the objective lens.

12. The objective lens moving apparatus of claim 1 wherein the direction from said reference positions in which the first and second means for receiving the elastic member holder in the base are shifted, is the tracking direction.

* * * * *